(12) United States Patent
Delapierre et al.

(10) Patent No.: US 8,601,885 B2
(45) Date of Patent: Dec. 10, 2013

(54) CONTACT FORCE SENSOR WITH AN ELASTOMER MATERIAL SECURED TO A DEFORMABLE MEMBRANE

(75) Inventors: Gilles Delapierre, Seyssins (FR); Patrice Rey, St Jean de Moirans (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 231 days.

(21) Appl. No.: 13/147,935

(22) PCT Filed: Feb. 11, 2010

(86) PCT No.: PCT/EP2010/051670
§ 371 (c)(1),
(2), (4) Date: Aug. 4, 2011

(87) PCT Pub. No.: WO2010/092092
PCT Pub. Date: Aug. 19, 2010

(65) Prior Publication Data
US 2011/0290037 A1    Dec. 1, 2011

(30) Foreign Application Priority Data
Feb. 13, 2009    (FR) ...................................... 09 50926

(51) Int. Cl.
*G01L 1/22*    (2006.01)
(52) U.S. Cl.
USPC .................................. 73/862.044; 73/862.041
(58) Field of Classification Search
USPC ...................... 73/862.041–862.046
See application file for complete search history.

(56) References Cited

U.S. PATENT DOCUMENTS

| | | | | |
|---|---|---|---|---|
| 4,426,884 A * | 1/1984 | Polchaninoff | .................. | 73/172 |
| 4,503,705 A * | 3/1985 | Polchaninoff | .................. | 73/172 |
| 4,722,348 A * | 2/1988 | Ligtenberg et al. | ........... | 600/488 |
| 5,060,527 A * | 10/1991 | Burgess | ..................... | 73/862.68 |
| 5,365,799 A | 11/1994 | Okada | | |
| 6,247,371 B1 | 6/2001 | Namerikawa et al. | | |
| 6,302,290 B1 * | 10/2001 | Engelaere | .................. | 220/359.4 |
| 6,732,590 B1 * | 5/2004 | Gottlieb et al. | ................. | 73/754 |

(Continued)

FOREIGN PATENT DOCUMENTS

| | | |
|---|---|---|
| DE | 40 17 265 A1 | 12/1991 |
| EP | 0 549 807 A1 | 7/1993 |

(Continued)

OTHER PUBLICATIONS

International Search Report issued Apr. 22, 2010 in PCT/EP2010/051670.

(Continued)

*Primary Examiner* — Max Noori
(74) *Attorney, Agent, or Firm* — Oblon, Spivak, McClelland, Maier & Neustadt, L.L.P.

(57) ABSTRACT

A triaxial force sensor including: a deformable membrane; a detector detecting a deformation of the membrane configured to carry out a triaxial detection of the force to be detected; and an adhesion mechanism disposed at least at one of the principal faces of the deformable membrane, configured to secure the one of the principal faces of the deformable membrane to at least one elastomer material to be acted upon by the force to be detected, and distributed uniformly at a whole of the surface of the one of the principal faces of the deformable membrane, the deformable membrane being disposed between a cavity and the elastomer material.

21 Claims, 10 Drawing Sheets

(56) References Cited

U.S. PATENT DOCUMENTS

| | | | |
|---|---|---|---|
| 7,772,657 B2* | 8/2010 | Vaganov | 257/415 |
| 8,393,229 B2* | 3/2013 | Tao et al. | 73/862.046 |
| 2003/0056579 A1 | 3/2003 | Poulbot et al. | |
| 2005/0081645 A1 | 4/2005 | Ohsato et al. | |
| 2008/0210022 A1 | 9/2008 | Rey et al. | |
| 2008/0276726 A1 | 11/2008 | Rey | |
| 2010/0043541 A1 | 2/2010 | Kobayakawa | |

FOREIGN PATENT DOCUMENTS

| | | |
|---|---|---|
| EP | 1 275 949 A1 | 1/2003 |
| EP | 1 847 823 A2 | 10/2007 |
| EP | 1 847 823 A3 | 10/2007 |
| EP | 2 085 253 A1 | 8/2009 |
| FR | 2 883 372 | 9/2006 |
| FR | 2 885 409 A1 | 11/2006 |
| FR | 2 885 410 | 11/2006 |
| WO | WO 2008/059838 A1 | 5/2008 |

OTHER PUBLICATIONS

Preliminary Search Report issued Sep. 11, 2009 in French Patent Application No. FR 0950926 FA 717822 (with English Translation of Category of Cited Documents).

* cited by examiner

CONTACT FORCE SENSOR WITH AN ELASTOMER MATERIAL SECURED TO A DEFORMABLE MEMBRANE

TECHNICAL FIELD

The invention concerns a contact force sensor. The invention applies for example for carrying out a measurement or monitoring a writing pressure, a simulation of feeling or a tyre adhesion measurement. The invention concerns in particular a triaxial contact force sensor embedded in an elastomer material, or in contact with an elastomer medium on which the force to be detected and optionally measured is exerted.

PRIOR ART

In order to measure a contact force applied to a surface of an elastomer material, for example the rubber of a tyre, the use of a force sensor 10 as shown in FIG. 1 and for example described in the document EP 1 275 949 A1 is known. This force sensor 10 comprises a deformable membrane 12 provided at its centre with a rod 14. The rod 14 is disposed within the elastomer material, which transmits said contact force to the rod 14. Because of the deformation that the elastomer material undergoes through the contact force applied to the surface thereof, the rod 14 is also subjected to this force and deforms the membrane 12 because of the torque and the movement caused at the centre of the membrane 12 by the rod 14. The deformation of the membrane 12 by the rod 14 is measured by transduction means 16, such as piezoresistive strain gauges or capacitance variation detectors, arranged on the membrane 12.

This sensor 10 therefore makes it possible to measure forces applied to the rod 14 by means of the elastomer material, these forces being able to be oriented perpendicular to the plane of the membrane 12, like for example the force Fz shown in FIG. 1, or oriented tangentially to the plane of the membrane 12, that is to say oriented in the plane of the membrane 12, like for example the force Fx also shown in FIG. 1.

This sensor 10 is for example produced using anisotropic chemical etching steps throughout the thickness of a silicon substrate, thus forming the membrane 12 and the rod 14 within this substrate. It is also possible to produce the membrane 12 and rod 14 from two distinct substrates, and then to attach the rod 14 to the surface of the membrane 12.

The document FR 2 885 409 A1 also describes such a force sensor, which also comprises anchoring means formed at the end of the rod in order to improve the transmission of the forces from the elastomer material to the rod.

Such sensors have the major drawback of being complex and expensive to manufacture, in particular when microelectronic technologies are used, either because of the use of a large number of steps necessary for producing the sensors, or because of the excessively long duration of the steps (in the case of anisotropic chemical etching carried out over the entire thickness of a single substrate in order to form the membrane and rod), or the use of several substrates (in the case of the rod produced from a substrate different from the one used for producing the membrane).

DISCLOSURE OF THE INVENTION

One aim of the present invention is to propose a force sensor that is less expensive to manufacture while offering a measuring quality substantially equivalent to that of the force sensors of the prior art.

For this purpose, the present invention proposes a triaxial force sensor comprising at least:
a deformable membrane,
means of detecting a deformation of the membrane able to carry out a triaxial detection of the force to be detected,
adhesion means disposed at least at one of the principal faces of the deformable membrane, able to secure said one of the principal faces of the deformable membrane to at least one elastomer material intended to be acted upon by the force to be detected, and distributed uniformly at the whole of the surface of said one of the principal faces of the deformable membrane, the deformable membrane being disposed between a cavity and the elastomer material.

Such a sensor makes it possible to achieve a strong mechanical connection between the elastomer material, or deformable material, and the deformable membrane, without having recourse to a rod intended to transmit the forces to the membrane. Thus this sensor does not require, for production thereof, the implementation of steps of long duration or a large number of steps, nor the use of several substrates, since the sensor according to the invention does not require a rod connected to the membrane.

Deformable membrane means, here and throughout the rest of the document, a membrane composed of a material, for example silicon, able to deform without significant hysteresis to a maximum relative elongation (maximum elongation with respect to the initial length) for example of around $2000.10^{-6}$ (or 2000 microdeformations). In addition, when the membrane is substantially flat, it comprises two principal faces parallel to the plane of the membrane.

In addition, given that the membrane is disposed between a cavity and the elastomer material, this membrane can therefore deform and follow the deformations of the elastomer material by virtue of the fact that the membrane is situated opposite the cavity, which allows this freedom of deformation of the membrane. By virtue of the cavity, the membrane can therefore undergo any deformation in space, enabling the sensor to carry out a triaxial force detection.

The adhesion means may be distributed uniformly over said one of the principal faces of the deformable membrane and/or be distributed at the whole of the surface of said one of the principal faces of the deformable membrane. Thus the adhesion means make it possible to achieve a distribution of the force applied to the elastomer material over the whole of the deformable membrane and therefore to effect a detection of this force whatever its direction of application.

There is also described a force sensor comprising at least:
a deformable membrane, for example substantially flat,
means of detecting a deformation of the membrane,
adhesion means, or anchoring or connection means, disposed at least at one of the principal faces of the deformable membrane and able to secure said one of the principal faces of the deformable membrane to at least one elastomer material intended to be acted on by the force to be detected.

According to a first variant, the adhesion means may comprise at least one layer of adhesive intended to be disposed between said one of the principal faces of the deformable membrane and the elastomer material.

According to a second variant, the adhesion means may comprise a plurality of anchoring pins intended to be disposed between said one of the principal faces of the deformable membrane and the elastomer material.

These two variants make it possible to achieve a solid adhesion between the membrane and the elastomer material.

The second variant however further improves the adhesion between the deformable membrane and the elastomer material.

Each anchoring pin may have a cross section, in a plane parallel to the plane passing through said one of the principal faces of the deformable membrane, with dimensions between approximately 100 nm and 10 µm. The thickness of an anchoring pin may also be between approximately 100 nm and 10 µm. A spacing between two adjacent anchoring pins may also be between approximately 100 nm and 10 µm, and may preferably be chosen so as to be greater than the dimensions of the anchoring pins in a plane parallel to the plane passing through said one of the principal faces of the deformable membrane. The anchoring pins may be composed of SiN and/or $SiO_2$ and/or polycrystalline silicon.

Advantageously, each anchoring pin may comprise a base formed by a first portion of material and an upper part formed by a second portion of material, the base being able to be disposed between said one of the principal faces of the membrane and the upper part and comprise a cross section, in a plane parallel to a plane passing through said one of the principal faces of the membrane, with dimensions less than those of a cross section, in a plane parallel to the plane passing through said one of the principal faces of the membrane, of the upper part.

The means of detecting a deformation of the membrane may comprise at least one strain gauge disposed on or in at least part of the deformable membrane. The strain gauge may be piezoresistive or piezoelectric.

The means of detecting a deformation of the membrane may in particular comprise a plurality of strain gauges, for example disposed on or in at least part of the deformable membrane, and connected electrically between them while forming two Wheatstone bridges. These strain gauges may be piezoresistive or piezoelectric.

In another variant, the means of detecting a deformation of the membrane may comprise at least three first capacitive detection electrodes disposed against one of the principal faces of the membrane and at least a second capacitive detection electrode secured to a non-deformable part of the sensor and disposed opposite the deformable membrane.

The number of first electrodes may be chosen according to the directions of deformation of the membrane to be measured. In the case where it is wished to carry out a measurement in several directions, the sensor may therefore comprise at least three first electrodes. Thus these sets of electrodes, each formed by a first and second electrode, make it possible to form at least three capacitors, the air gap of which is variable with the deformation of the membrane, the measurement of these three capacitors making it possible to know the three components (along three axes of an orthogonal reference frame) of the force to be detected.

The deformable membrane may comprise a portion of a substrate composed of a semiconductor, said portion of the substrate being able to comprise for example a thickness of between approximately 0.1 µm and a few hundreds of micrometres (that is to say less than approximately 1 mm) or between approximately 1 µm and 100 µm, or a portion of an active layer of a substrate, for example of the SOI type, disposed above the cavity formed in a dielectric sub-layer of the substrate for example with a thickness of between approximately 0.1 µm and 10 µm.

The force sensor may also comprise an electrically insulating layer disposed between the deformable membrane and the adhesion means.

The force sensor may also comprise means of processing information issuing from the means of detecting a deformation of the membrane, suitable for determining the direction and intensity of the force to be detected from the information issuing from the detection means.

The present invention also concerns a method of producing a triaxial force sensor, comprising at least the following steps:
   production of a deformable membrane,
   production of means of detecting a deformation of the membrane suitable for carrying out a triaxial detection of the force to be detected,
   production of means of adhesion on at least one of the principal faces of the deformable membrane distributed uniformly at the whole of the surface of said one of the principal faces of the deformable membrane,
   the adhesion means being able to secure said one of the principal faces of the deformable membrane to at least one elastomer material intended to be acted on by the force to be detected and the deformable membrane being disposed between a cavity and the elastomer material.

A method of producing a force sensor is also described, comprising at least the following steps:
   production of a deformable membrane, for example substantially flat,
   production of means of detecting a deformation of the membrane,
   production of means of adhesion to at least one of the principal faces of the deformable membrane,
   the adhesion means being able to secure said one of the principal faces of the deformable membrane to at least one elastomer material intended to be acted on by the force to be detected.

The production of the deformable membrane may comprise a step of working a portion of a substrate composed of a semi-conductor, also forming the cavity.

In a variant, the production of the deformable membrane may comprise a step of producing at least one opening through at least one active layer of a substrate, for example of the SOI type, and a step of etching a portion of a dielectric sub-layer of the substrate through the opening forming the cavity above which a portion of the active layer forms the deformable membrane.

The production of the means of detecting a deformation of the membrane may comprise a step of implantation of dopants in the membrane, forming in the deformable membrane at least one piezoresistive strain gauge, and/or a plurality of strain gauges electrically connected to one another, forming two Wheatstone bridges.

The production of the means of detecting a deformation of the membrane may comprise a step of producing at least three first capacitive detection electrodes against one of the principal faces of the membrane and a step of producing at least one second capacitive detection electrode secured to a non-deformable part of the sensor opposite the deformable membrane.

The production of the adhesion means may comprise at least one step of depositing a layer of adhesive on said one of the principal faces of the deformable membrane.

In a variant, the production of the adhesion means may comprise at least the production of a plurality of anchoring pins.

In this case, the production of the anchoring pins may be obtained by the implementation of the following steps:
   deposition of a first layer on said one of the principal faces of the deformable membrane and of a second layer on the first layer, the first and second layers each being composed of a material that can be etched selectively with respect to each other;

etching of the second layer, leaving portions of the second layer forming upper parts of the anchoring pins;

etching of the first layer for a period greater than that of the first step of etching the second layer, leaving, under the remaining portions of the second layer, portions of the first layer each forming a base of an anchoring pin.

In another variant, the production of the anchoring pins may be obtained by implementing the following steps:

deposition of a sacrificial layer on said one of the principal faces of the deformable membrane, etching of a plurality of holes in the sacrificial layer, deposition of an anchoring material in the holes and on the sacrificial layer around the holes, forming the anchoring pins, elimination of the sacrificial layer.

The method of producing the force sensor may also comprise, between the step of producing the means of detecting a deformation of the membrane and the step of producing the adhesion means, at least one step of depositing an electrically insulating layer on said one of the principal faces of the deformable membrane, covering at least part of the means of detecting a deformation of the membrane, the adhesion means then being produced on the electrically insulating layer.

BRIEF DESCRIPTION OF THE DRAWINGS

The present invention will be better understood from a reading of the description of example embodiments given purely for indicative and in no way limitative purposes, referring to the accompanying drawings, in which.

Identical, similar or equivalent parts in the different figures described above bear the same numerical references so as to facilitate passing from one figure to another.

The different parts shown in the figures are not necessarily shown according to a uniform scale, in order to make the figures more legible.

The different possibilities (variants and embodiments) must be understood as not being exclusive of one another and may be combined with one another.

DETAILED DISCLOSURE OF PARTICULAR EMBODIMENTS

Figure 1:
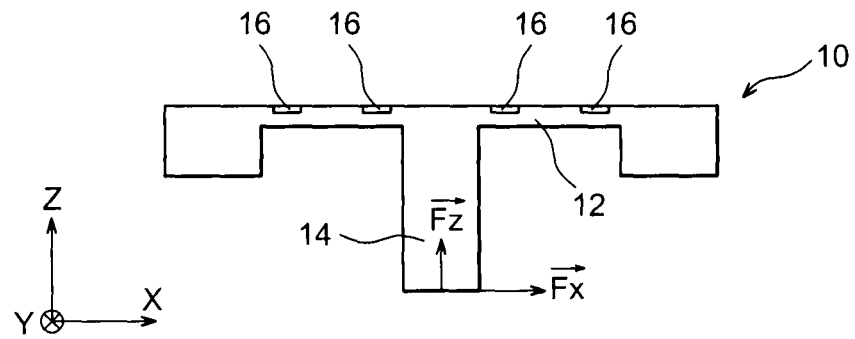
FIG. 1 shows a force sensor according to the prior art.
Figure 2:
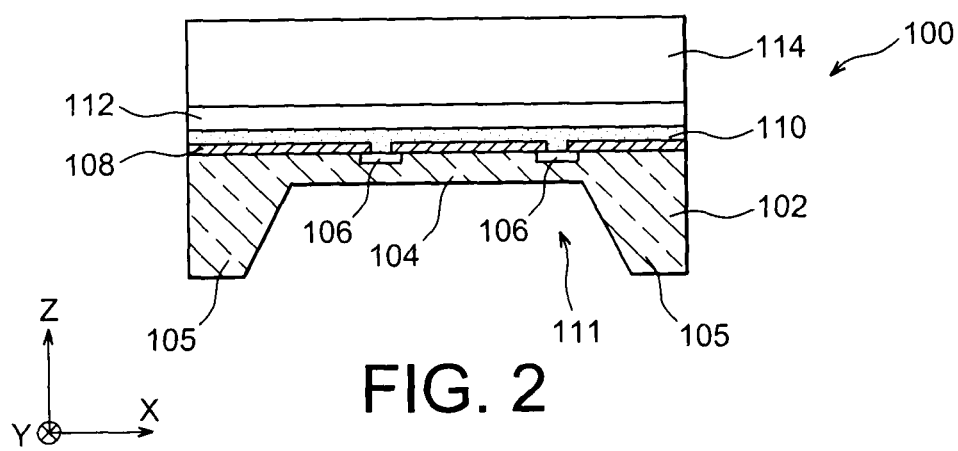
FIG. 2 shows a profile view in cross section of a force sensor that is the subject matter of the present invention, according to a first embodiment.

Reference is made first of all to FIG. 2, which shows a force sensor 100 according to a first embodiment.

This sensor 100 is produced from a substrate 102, for example composed of a semiconductor such as silicon. The sensor 100 comprises a deformable membrane 104 comprising a portion of the substrate 102 etched over part of the thickness of the substrate 102. The deformable membrane 104 is here substantially flat, these dimensions in the plane of the substrate 102, that is to say in a plane parallel to the plane (X, Y) shown in FIG. 2, being very much greater than the thickness of the membrane 104 (dimension along the axis Z perpendicular to the plane of the substrate 102). The membrane 104 comprises two principal faces parallel to the plane of the substrate 102. Non-etched portions 105 of the substrate 102 form peripheral anchoring zones of the membrane 102. In this first embodiment, the form of the membrane 104 in the plane of the substrate 102 is a disc. However, the membrane 104 may have, in the plane of the substrate 102, an entirely different form. The thickness of the membrane 104 (dimension along the axis Z shown in FIG. 2) is for example between approximately 1 μm and 100 μm.

The membrane 104 is disposed above a cavity 111 formed in the substrate 102, this cavity 111 being situated between the non-etched portions 105.

The sensor 100 also comprises strain gauges 106, here of the piezoresistive type, produced in the membrane 104, at one of the principal faces of the membrane 104. Connections 108 produced on the membrane 104 electrically connect the strain gauges 106 to processing means, not shown, able to process the information delivered by the strain gauges 106 (variations in the resistances of these gauges).

An electrically insulating layer 110, for example composed of a dielectric such as $SiO_2$, is disposed on the substrate 102 and membrane 104, thus covering the strain gauges 106 and the connections 108. Finally, a layer of adhesive 112 is disposed on the insulating layer 110, thus securing the deformable membrane 104 to an elastomer material 114 in which the force to be measured is exerted. The layer of adhesive 112 is for example composed of epoxy and/or polyurethane glue and has for example a thickness of between approximately 0.1 μm and 10 μm. This elastomer material 114 is here formed by a layer composed of a single material. However, it is also possible for the elastomer material 114 to be formed by the superimposition of several layers of materials, different or not. In this first embodiment, the sensor 100 is embedded in the elastomer material 114, which is for example composed of rubber, the sensor 100 being for example intended to measure forces exerted by the road on the surface of a tyre composed of the elastomer material 114. In a variant, the elastomer material 114 could be composed of polyurethane or a silicone polymer such as polydimethylsiloxane (PDMS). In a variant, it is also possible for the sensor 100 not to be embedded in the elastomer material 114 but for only the layer of adhesive at 112 to be in contact with this elastomer material 114.

Thus, when the elastomer material 114 is subjected to a force that it is wished to measure, this force is transmitted to the membrane 104, which deforms over the whole of its surface in a similar manner to the elastomer material 114 by means of the layer of adhesive 112, which forms a strong mechanical connection by virtue of the adhesion achieved between the deformable membrane 104 and the elastomer material 114. This deformation is in particular possible because of the fact that the deformable membrane 104 is disposed facing the cavity 111 and can deform in the cavity 111. The deformation of the membrane 104 means that the strain gauges 106 also deform. The values of the resistances of the strain gauges 106 then vary according to the deformation undergone, which makes it possible, by measuring these variations in resistance, to measure the value and direction of the force that initially deformed the elastomer material 114.

The strain gauges 106 are distributed over the whole of the membrane 104 in order to be able to identify the different components of the force to be detected. Thus, by choosing a suitable number of strain gauges 106 and disposing them in a suitable manner, a triaxial force sensor 100 is produced suitable for measuring components of forces along the three axes X, Y and Z of an orthogonal reference frame, and therefore making it possible to measure any force oriented in any direction in space.

Figure 3:
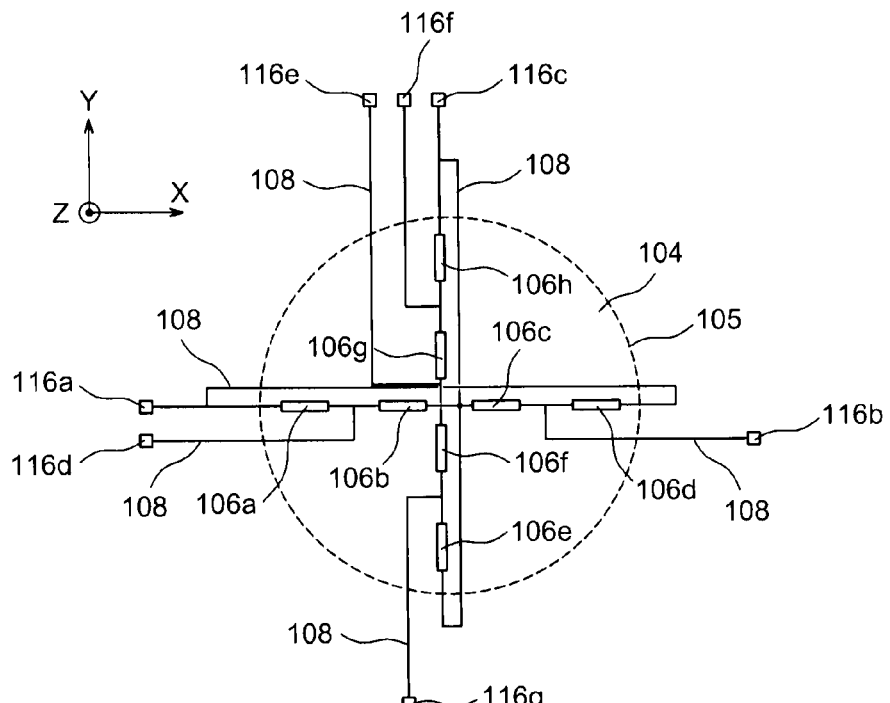
FIG. 3 shows an example of an arrangement, in two 90° Wheatstone bridges, of strain gauges of a force sensor that is the subject matter of the present invention, according to the first embodiment.

The strain gauges 106 may for example form two Wheatstone bridges as in the example illustrated in FIG. 3. In this figure, the membrane 104, seen from above, is represented symbolically by a broken line 105 forming a circle (the shape of the membrane 104 in the plane (X, Y)). Four first strain gauges 106a to 106d are disposed along a horizontal axis (parallel to the axis X) passing through the centre of the circle 105 formed by the membrane 104, and aligned in a first direction. These four first strain gauges 106a to 106d are connected together by connections 108 and form a first Wheatstone bridge. The connections 108 also connect the four first strain gauges 106a to 106d to four electrical contacts 116a to 116d forming the inputs and outputs of this first Wheatstone bridge. Four second strain gauges 106e to 106h are also disposed along a vertical axis (parallel to the axis Y) passing through the centre of the circle 105 formed by the membrane 104, and aligned in a second direction perpendicular to the first direction. These four second strain gauges 106e to 106h are connected together by the connections 108 and form a second Wheatstone bridge. The connections 108 also connect the four strain gauges 106e to 106h to three electrical contacts 116e to 116g and to the electrical contact 116c forming the inputs and outputs of this second Wheatstone bridge. The strain gauges 106a to 106h are for example in the form of right-angled parallelepipeds and each have their greatest dimension parallel to the first or second direction.

Figure 4:
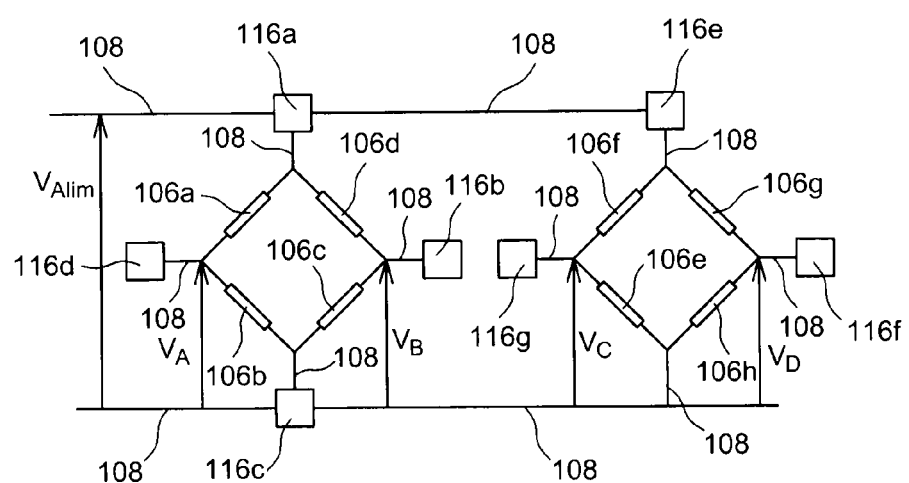
FIG. 4 shows an equivalent electrical diagram of strain gauges forming two Wheatstone bridges and shown in FIG. 3, FIGS. 5 and 6 show profile views in cross section of a force sensor that is the subject matter of the present invention, respectively according to a second embodiment and according to a variant of the second embodiment.

An electrical diagram of the two Wheatstone bridges of FIG. 3 is shown in FIG. 4. A supply voltage $V_{alim}$ is applied between the electrical contacts 116a and 116c, and between the electrical contact 116e and the intersection of the strain gauges 106e and 106h. Voltages $V_A$, $V_B$, $V_C$ and $V_D$ are then measured, corresponding respectively to the potentials of the electrical contacts 116d, 116b, 116g and 116f.

The imbalance in the first Wheatstone bridge, corresponding to $V_B-V_A$, is proportional to the component parallel to the direction of the axis X, corresponding to the first direction on which the four first strain gauges 106a to 106d are aligned, of the force to be measured. The imbalance in the second Wheatstone bridge, corresponding to $V_D-V_C$ is proportional to the component parallel to the direction of the axis Y, corresponding to the second direction on which the four second strain gauges 106e to 106h are aligned, of the force to be measured. Finally, the common mode of the two Wheatstone bridges, corresponding to $(V_A+V_B)-(V_D+V_C)$, is proportional to the component parallel to the axis Z, that is to say perpendicular to the plane of the membrane 104, of the force that it is sought to measure. The measurements of these three components therefore make it possible to determine completely the direction and intensity of the force transmitted by the elastomer material 114.

Figure 5:
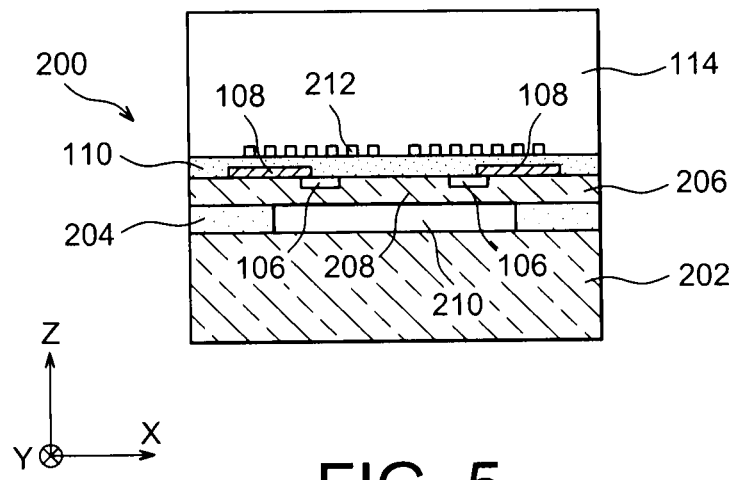

Reference is now made to FIG. 5, which shows a force sensor 200 according to a second embodiment.

Compared with the sensor 100 previously described, the sensor 200 is not produced from a substrate of the bulk (solid) type but from an SOI (semiconductor on insulator) substrate comprising a solid layer 202, for example composed of a semiconductor such as silicon, on which are disposed a dielectric layer 204, for example composed of $SiO_2$, and an active layer 206, here also composed of silicon.

The sensor 200 comprises a membrane 208 formed by a portion of the active layer 206 disposed on top of a cavity 210 formed in the dielectric sublayer 204. The membrane 208 has for example a form, in the plane of the substrate parallel to the plane (X, Y), similar to that of the membrane 104 previously described, that is to say a disc. The portions of the active layer 206 peripheral to the membrane 208 form peripheral anchoring regions for the membrane 208.

In a similar manner to the sensor 100, the sensor 200 comprises the strain gauges 106, the connections 108 and the insulating layer 110 covering the strain gauges 106, the connections 108 and the active layer 206.

However, compared with the sensor 100 according to the first embodiment, the mechanical connection between the elastomer material 114 and the membrane 208 is effected not by a layer of adhesive but by a plurality of anchoring pins 212 produced on the membrane 208 by means of the insulating layer 110. In a similar manner to the layer of adhesive 112, the anchoring pins 212 effect a strong mechanical connection between the elastomer material 114 and the membrane 208. The dimensions of the anchoring pins 212 (dimensions along the axes X, Y or Z) as well as the spacing between two adjacent anchoring pins 212 may for example be between approximately 100 nm and 10 μm. In addition, the cross-sections of the anchoring pins in the plane of the substrate (parallel to the plane (X, Y)) may have the shape of a disc, a square or any other shape.

Advantageously, the anchoring pins 212 may have the shape of a "mushroom", this shape comprising at least two parts, one forming the base of the pin and the other forming the top, or upper part of the pin, the base of the pin comprising a cross-section in the plane of the substrate with dimensions smaller than those of the cross-section of the top of the pin. By producing the anchoring pins 212 in this form, the mechanical connection between the membrane 208 and the elastomer material 114 is further improved. The anchoring pins may be composed of any material, for example a metal or dielectric material.

In a variant of the second embodiment, the sensor 200 could be produced from a bulk substrate rather than from an SOI substrate, in a similar manner to the sensor 100 previously described. The membrane 208 would then be formed by a portion of this bulk substrate at which the substrate would have been etched over a part of its thickness.

Figure 6:
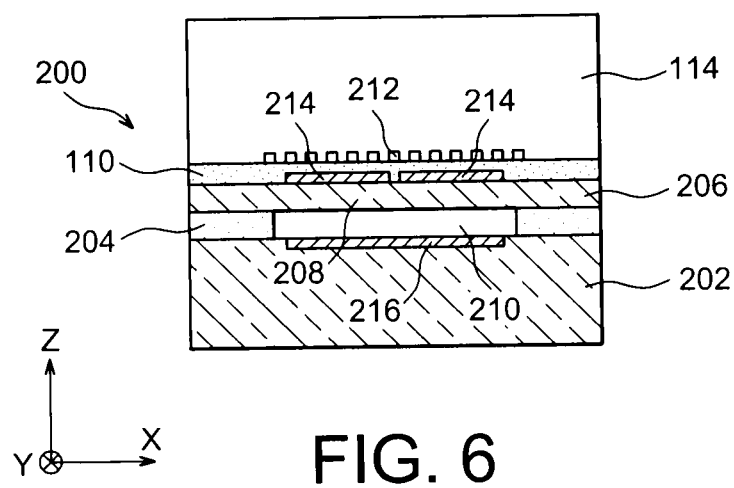

Reference is made to FIG. 6, which shows the sensor 200 produced according to another variant of the second embodiment. Compared with the sensor previously described in relation to FIG. 5, this sensor 200 includes not piezoresistive strain gauges for detecting the deformation of the membrane 208 but several electrodes 214 disposed on the membrane 208. Although in FIG. 6 only two electrodes 214 are shown, the sensor 200 preferably comprises at least three electrodes 214 in order to effect a triaxial detection of the force to be detected deforming the membrane 208. In addition, in this variant embodiment, this sensor 200 also comprises a common electrode 216 produced on or in the solid layer 212, in the cavity 210, opposite the membrane 208.

Figure 7A:
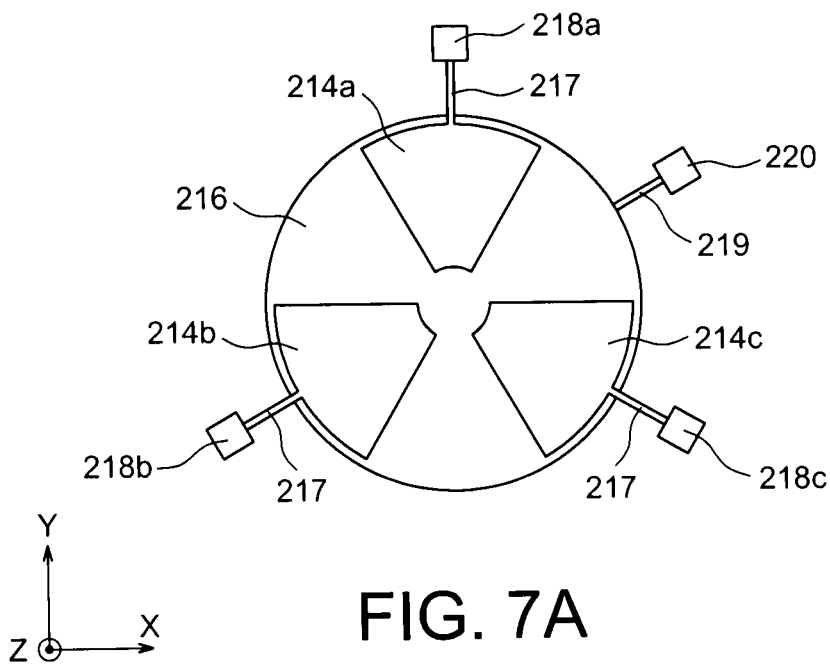
FIGS. 7A and 7B show plan views of the electrodes of a force sensor that is the subject matter of the present invention, according to two variants of the second embodiment.
Figure 7B:
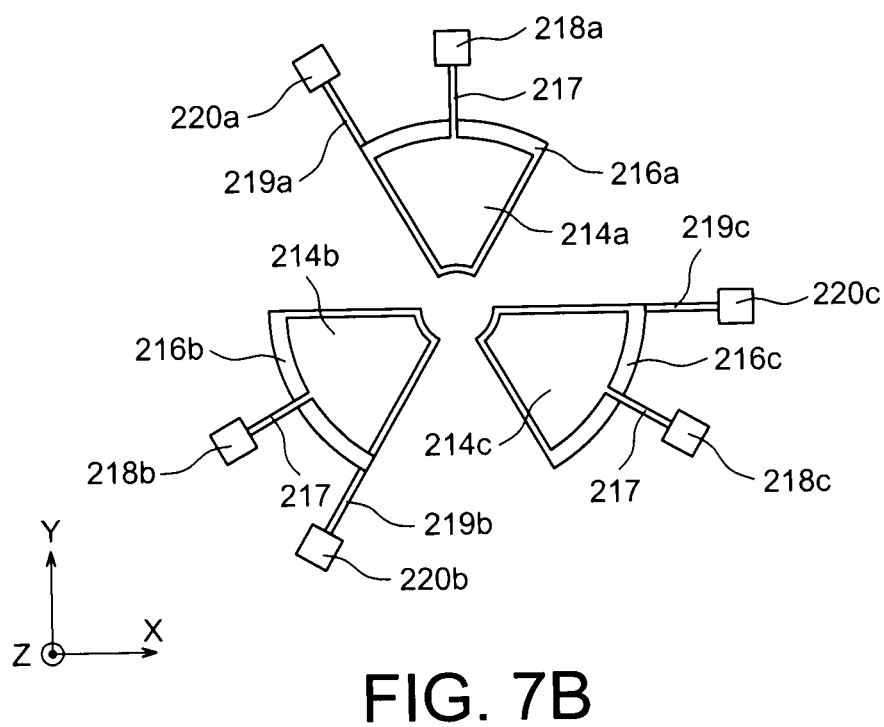

FIG. 7A shows a plan view of the three electrodes 214a to 214c produced on the membrane 208 and of the common electrode 216 disposed in the cavity 210. In this figure, it can be seen that each of the electrodes 214a, 214b and 214c is connected to an electrical contact 218a, 218b, 218c by means of a connection 217. The common electrode 216 is also connected to an electrical contact 220 by means of a connection 219. In a variant shown in FIG. 7B, the common electrode 216 is replaced by three lower electrodes 216a, 216b and 216c substantially superimposed on the three electrodes 214a, 214b and 214c, each connected to an electrical contact 220a, 220b and 220c by means of a connection 219a, 219b and 219c.

These electrodes thus form capacitors, the air gap of which is variable with the deformation of the membrane 208 of the sensor 200. By measuring the three capacitances between each of the three electrodes 214 disposed on the membrane 208 of the sensor 200 and the common electrode 216 or the lower electrodes 216a, 216b, 216c disposed in the cavity 210, it is possible to determine the value of the three components (along the three axes X, Y and Z) of the force exerted in the elastomer material 114.

In another variant, it is possible to produce more than three variable capacitances. It is for example possible to provide the sensor with four upper electrodes, two of these electrodes being disposed along a horizontal axis passing through the centre of the membrane and the other two electrodes being disposed along a vertical axis passing through the centre of the membrane (these axes lying within the plane passing through the principal face of the membrane on which the upper electrodes are produced). These four upper electrodes are disposed at the same distance from the centre of the membrane. It is then possible to have recourse to a single common electrode or to four lower electrodes in order to form four variable capacitors. Such a configuration with four variable capacitors makes it possible to simplify the measurements to be made in order to characterise the force that it is sought to detect.

These variant embodiments of the sensor performing a capacitive detection of the deformations of the membrane of the sensor may also be applied to the sensor 100 previously described. In this case, the three electrodes 214 would be disposed on the membrane 104 and the common electrode or the lower electrodes 216 would be disposed in the hollow produced in the substrate 102, on a non-deformable part of the sensor that would be disposed under the membrane 104.

Reference is now made to FIGS. 8A to 8E, which show steps of a method of producing the sensor 100 according to the first embodiment.

Figure 8A:
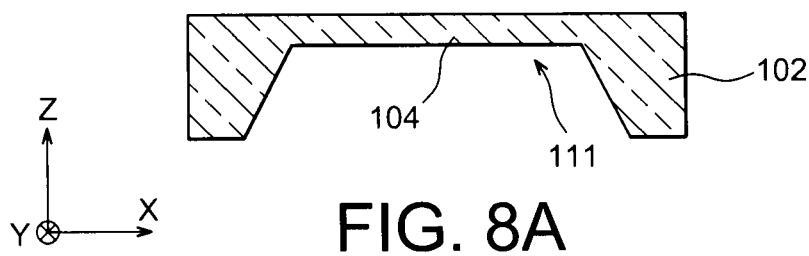
FIGS. 8A to 8E show steps of a method of producing the force sensor that is the subject matter of the present invention, according to the first embodiment.

As shown in FIG. 8A, a working of the substrate 102 is first of all carried out, for example by anisotropic chemical etching, over part of the thickness of the substrate 102, thus forming the membrane 104 and the cavity 111.

Figure 8B:
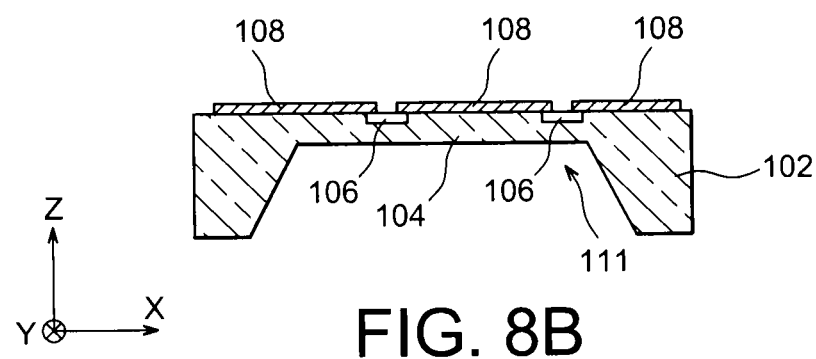

The strain gauges 106 are next produced in the membrane 104, for example by a diffusion of dopants, of the conductivity type opposite to that of the substrate 102, which forms portions of doped semiconductor, these doped portions forming the piezoresistive strain gauges 106. The connections 108 are then produced by a deposition of an electrically conductive layer, for example composed of a metal, and an etching of this electrically conductive layer (FIG. 8B).

Figure 8C:
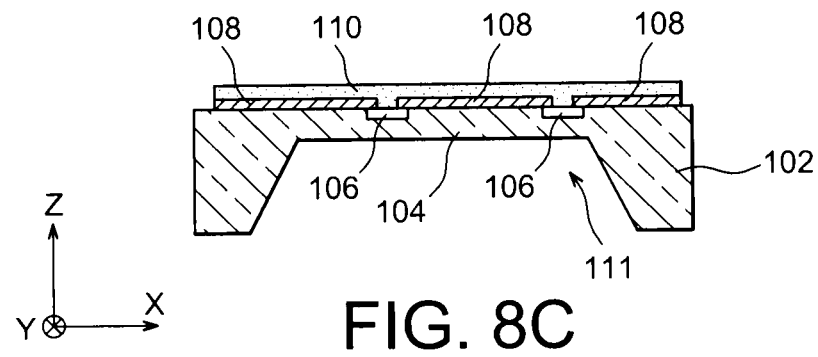

The insulating layer 110 is next deposited on the membrane 104, thus covering the strain gauges 106 and the connections 108 (FIG. 8C).

Figure 8D:
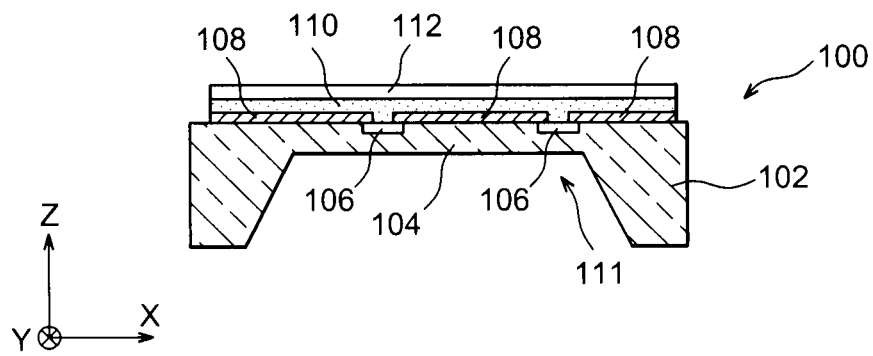
Figure 8E:
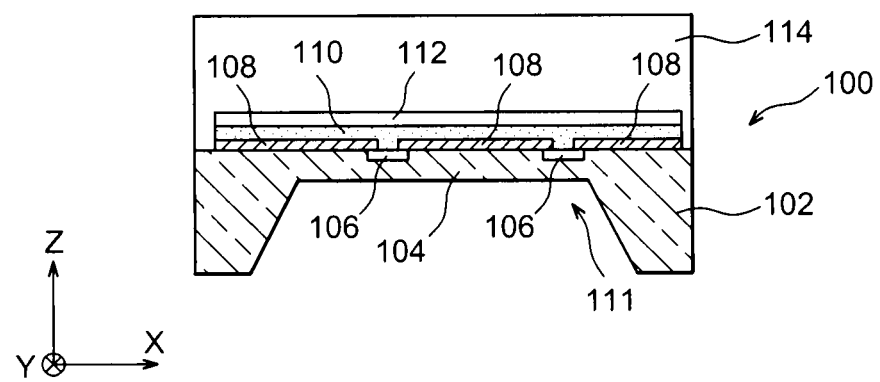

As shown in FIG. 8D, the layer of adhesive 112 is then deposited on the insulating layer 110. Finally, as shown in FIG. 8E, the layer of adhesive 112 is put in contact with the elastomer material 114, either by disposing the sensor 100 against the elastomer material 114, or by completely embedding the sensor 100 in the elastomer material 114.

Reference is now made to FIGS. 9A to 9D, which show steps of a method of producing the force sensor 200 according to the second embodiment previously described in relation to FIG. 5.

Figure 9A:
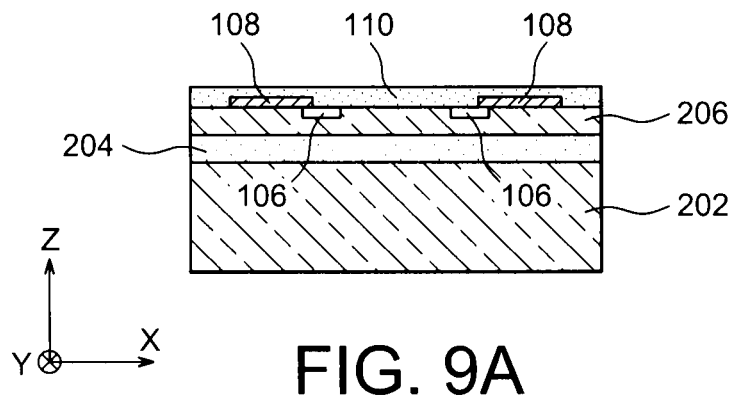
FIGS. 9A to 9D show steps of a method of producing the force sensor that is the subject matter of the present invention, according to the second embodiment.

From the SOI substrate comprising the layers 202, 204 and 206, the piezoresistive strain gauges 106 are first of all produced in the active layer 206 of silicon, for example by implantation of dopants as previously described for the sensor 100, and then the interconnections 108 on the active layer 206 electrically connecting the strain gauges 106. The insulating layer 110 is then deposited on the active layer 206, covering the strain gauges 106 and the connections 108 (FIG. 9A).

Figure 9B:
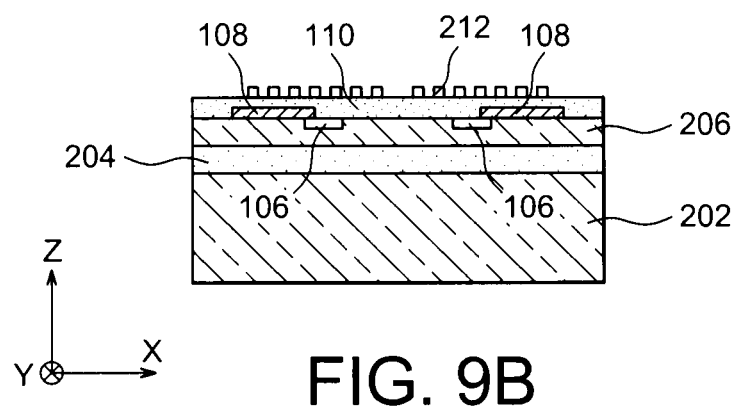

As shown in FIG. 9B, a layer, for example metal, is deposited, and then this layer is etched in order to form the anchoring pins 212. In this case, the anchoring pins 212 have a cross-section, in the plane of the substrate (parallel to the plane (X,Y)) with dimensions substantially constant over the entire height thereof (dimension along the axis Z).

In a preferred embodiment, the anchoring pins 212 may have the shape of a "mushroom", that is to say having a base with a cross-section in the plane of the substrate with dimensions less than those of the cross-section of the top of the pin. Example embodiments of such anchoring pins 212 will be described below in relation to FIGS. 10A to 10D and 11A to 11D.

Figure 9C:
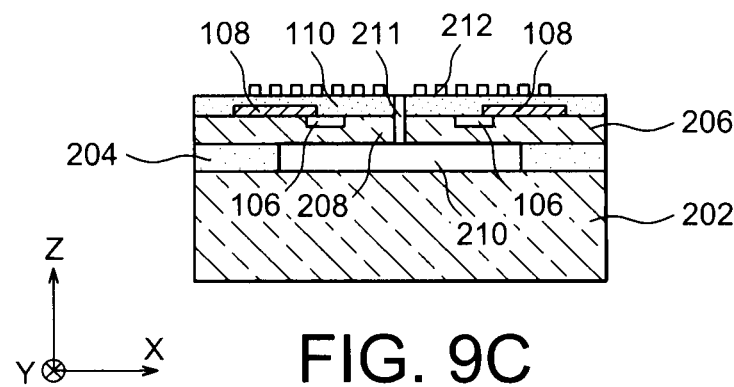
Figure 9D:
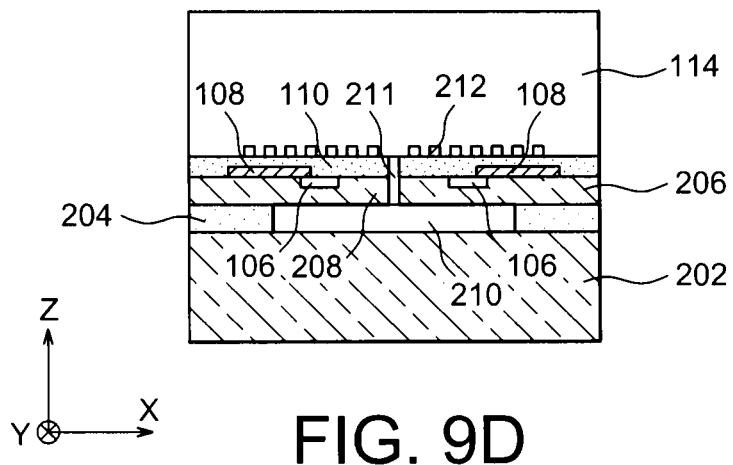

As shown in FIG. 9C, an opening 211 is etched, for example a hole with a diameter for example less than approximately 10 μm, through the insulating layer 110 and the active layer 206 in order to form an access to the dielectric layer 204. This hole is for example produced between two adjacent anchoring pins 212. The dielectric layer 204 is then etched by chemical etching through the opening 211 in order to form the cavity 210 and thus produce the membrane 208. Finally, the insulating layer 110 and the anchoring pins 212 are put in contact with the elastomer material 114 either by disposing the sensor 200 against the elastomer material 114 or by completely embedding the sensor 200 in the elastomer material 114.

Figure 10A:
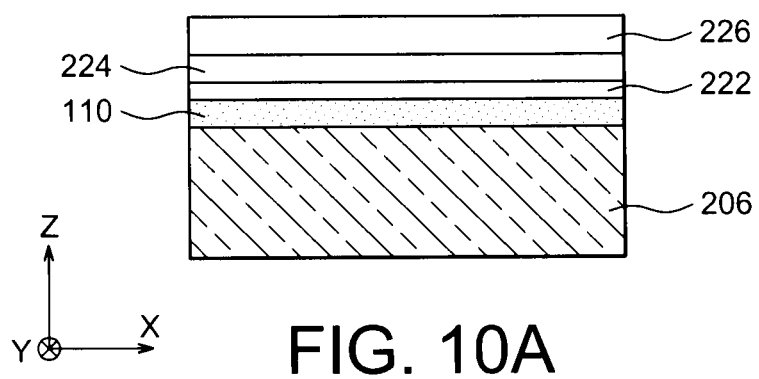
FIGS. 10A to 10D and 11A to 11D show steps of two variant embodiments of anchoring pins of a force sensor that is the subject matter of the present invention, according to the second embodiment.
Figure 10B:
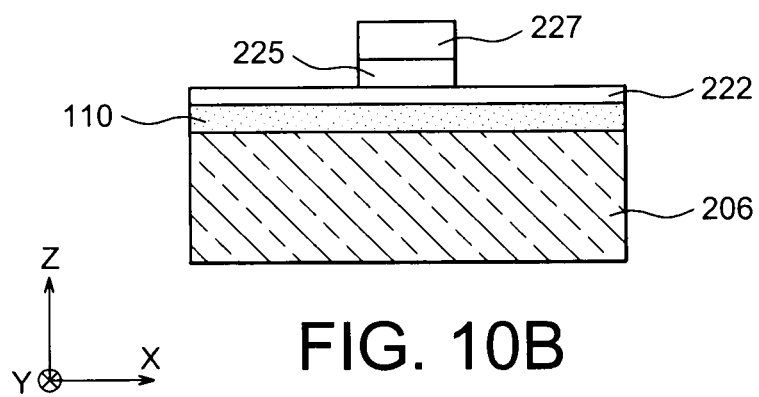
Figure 10C:
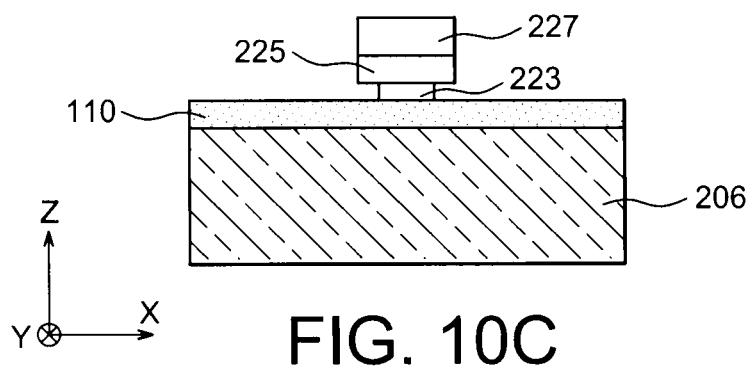
Figure 10D:
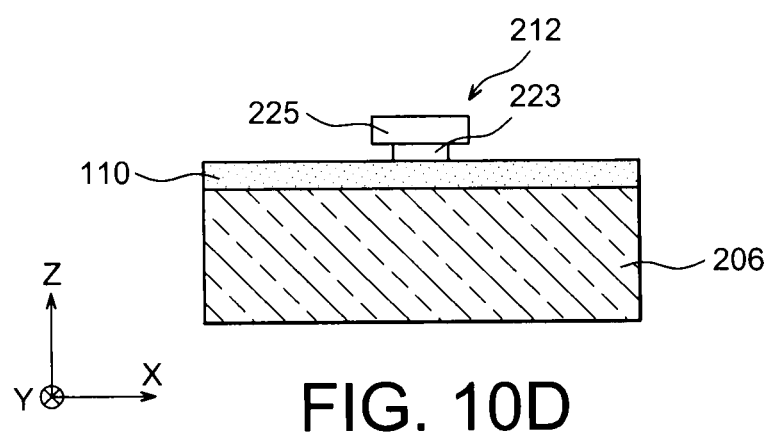

Reference is now made to FIGS. 10A to 10D, which describe steps of production of an anchoring pin 212 in a "mushroom" shape according to a first example embodiment. First of all, two layers 222, 224 superimposed one on the other are for example deposited. The materials of the bottom layer 222 and of the top layer 224 are chosen so that they can be etched selectively with respect to each other. For example, a bottom layer 222 composed of $SiO_2$ and a top layer 224 composed of SiN are chosen, or a bottom layer 222 composed of polycrystalline silicon and a top layer 224 composed of $SiO_2$. A layer of photosensitive resin 226 is then deposited on the top layer 224 (FIG. 10A). Steps of photolithography and etching of the layer of resin 226 are then performed in order to form a portion 227 of photosensitive resin with a shape and dimensions corresponding to the shape and dimensions required for the top of the anchoring pin, and then selective etching of the top layer 224 using the portion of resin 227 as an etching mask, thus forming the top 225 of the anchoring pin (FIG. 10B). Next the bottom layer 222 is etched selectively using the portion of resin 227 as an etching mask. Over-etching of this layer 222 is performed by extending the etching time for the bottom layer 222 compared with that of the etching of the top layer 224 so that a remaining portion 223 of the bottom layer 222 forms a base of the anchoring pin 212 with dimensions less than those of the top 225 of the anchoring pin 212 (FIG. 10C). Finally, as shown in FIG. 10D, the portion of resin 227 is removed, for example by etching. Although the steps described above concern the production of a single anchoring pin 212, all the anchoring pins 212 of the force sensor 200 are produced simultaneously and collectively in a similar manner to that described here.

Figure 11A:
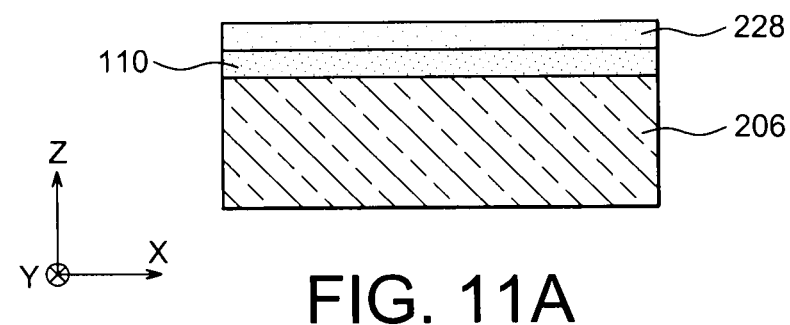

A second example embodiment of anchoring pins 212 in the form of "mushrooms" is described in relation to FIGS. 11A to 11D. As shown in FIG. 11A, a sacrificial layer 228, for example composed of $SiO_2$, is first of all deposited on the insulating layer 110.

Figure 11B:
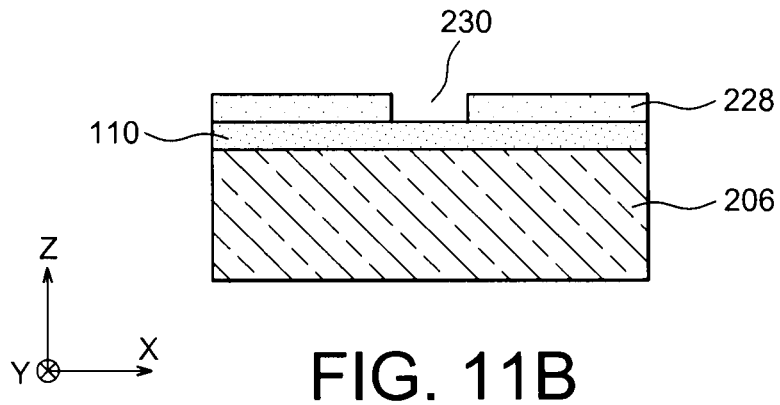
Figure 11C:
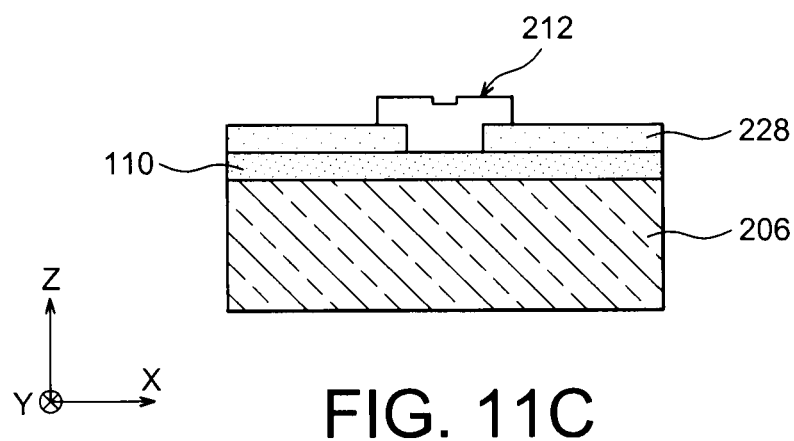
Figure 11D:
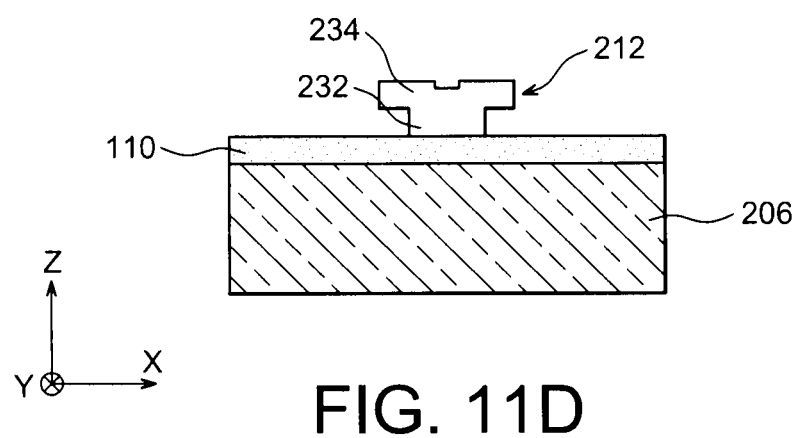

Next the sacrificial layer 228 is etched in order to form in the sacrificial layer an opening 230 the shape and dimensions of which correspond to those of the base of the anchoring pin 212 (FIG. 11b). Next the anchoring material for forming the anchoring pin 212 (FIG. 11C) is deposited in the opening 230 and on the sacrificial layer 228, around the opening 230. Finally, the sacrificial layer 228 is removed, for example by etching (FIG. 11D). The anchoring pin 212 obtained therefore comprises a base 232 with dimensions less than those of a top part 234 of the anchoring pin 212. Here also, all the anchoring pins 212 are produced simultaneously and collectively by the steps described above in relation to FIGS. 11A to 11D.

The invention claimed is:

1. A triaxial force sensor comprising:
a deformable membrane;
a detector to detect a deformation of the membrane configured to carry out a triaxial detection of the force to be detected, disposed on one of the principal faces of the deformable membrane; and
an adhesion part disposed at least on the one of the principal faces of the deformable membrane, configured to secure the one of the principal faces of the deformable membrane to at least one elastomer material to be acted upon by the force to be detected, and distributed uniformly on a whole of the surface of the one of the principal faces of the deformable membrane, the deformable membrane being disposed between a cavity and the elastomer material, the adhesion part is distinct from the deformable membrane, the elastomer material is distinct from the adhesion part and the deformable membrane, and the adhesion part is between the deformable membrane and the elastomer material.

2. The triaxial force sensor according to claim 1, in which the adhesion part comprises at least one layer of adhesive configured to be disposed between the one of the principal faces of the deformable membrane and the elastomer material.

3. The triaxial force sensor according to claim 1, in which the adhesion part comprises a plurality of anchoring pins configured to be disposed between the one of the principal faces of the deformable membrane and the elastomer material.

4. The triaxial force sensor according to claim 3, in which each anchoring pin has a cross-section, in a plane parallel to the plane passing through the one of the principal faces of the deformable membrane, with dimensions between approximately 100 nm and 10 μm, or in which a spacing between two adjacent anchoring pins is between approximately 100 nm and 10 μm.

5. The triaxial force sensor according to claim 3, in which the anchoring pins are composed of at least one of SiN, $SiO_2$, and polycrystalline silicon.

6. The triaxial force sensor according to claim 3, in which each anchoring pin comprises a base formed by a first portion of material and a top part formed by a second portion of material, the base being disposed between the one of the principal faces of the membrane and the top part and comprising a cross-section, in a plane parallel to a plane passing through the one of the principal faces of the membrane, with dimensions less than those of a cross-section in a plane parallel to the plane passing through the one of the principal faces of the membrane, of the top part.

7. The triaxial force sensor according to claim 1, in which the detector to detect the deformation of the membrane comprises a plurality of strain gauges electrically connected to one another, forming two Wheatstone bridges.

8. The triaxial force sensor according to claim 1, in which the detector to detect the deformation of the membrane comprises at least three first capacitive detection electrodes disposed against the one of the principal faces of the membrane and at least a second capacitive detection electrode secured to a non-deformable part of the sensor and disposed opposite the deformable membrane.

9. The triaxial force sensor according to claim 1, in which the deformable membrane comprises a portion of a substrate composed of a semiconductor or a portion of an active layer of a substrate disposed above the cavity formed in a dielectric sublayer of the substrate.

10. The triaxial force sensor according to claim 1, further comprising an electrically insulating layer, disposed between the deformable membrane and the adhesion part.

11. The triaxial force sensor according to claim 1, further comprising a processor to process information issuing from the detector to detect the deformation of the membrane, configured to determine a direction and intensity of the force to be detected from the information issuing from the detector.

12. A method of producing a triaxial force sensor, comprising:
producing a deformable membrane;
producing a detector to detect a deformation of the membrane for carrying out a triaxial detection of the force to be detected, on one of the principal faces of the deformable membrane; and
producing an adhesion part on at least the one of the principal faces of the deformable membrane distributed uniformly on a whole of the surface of the one of the principal faces of the deformable membrane;
the adhesion part configured to secure the one of the principal faces of the deformable membrane to at least one elastomer material to be acted on by the force to be detected and the deformable membrane being disposed between a cavity and the elastomer material, the adhesion part is distinct from the deformable membrane, the elastomer material is distinct from the adhesion part and the deformable membrane, and the adhesion part is between the deformable membrane and the elastomer material.

13. The method of producing a triaxial force sensor according to claim 12, in which the producing the deformable membrane comprises working a portion of a substrate composed of a semi-conductor, also forming the cavity.

14. The method of producing a triaxial force sensor according to claim 12, in which the producing the deformable membrane comprises producing at least one opening through at least an active layer of a substrate and etching a portion of a dielectric sublayer of the substrate through the opening forming the cavity above which a portion of the active layer forms the deformable membrane.

15. The method of producing a triaxial force sensor according to claim 12, in which the producing the detector to detect the deformation of the membrane comprises implanting dopants in the membrane, forming in the deformable membrane a plurality of strain gauges electrically connected to one another, forming two Wheatstone bridges.

16. The method of producing a triaxial force sensor according to claim 12, in which the producing the detector to detect the deformation of the membrane comprises producing at least three first capacitive detection electrodes against the one of the principal faces of the membrane and producing at least a second capacitive detection electrode secured to a non-deformable part of the sensor opposite the deformable membrane.

17. The method of producing a triaxial force sensor according to claim 12, in which the producing the adhesion part comprises depositing a layer of adhesive on the one of the principal faces of the deformable membrane.

18. The method of producing a triaxial force sensor according to claim 12, in which the producing the adhesion part comprises at least producing a plurality of anchoring pins.

19. The method of producing a triaxial force sensor according to claim 18, in which the producing the anchoring pins comprises:
  depositing a first layer on the one of the principal faces of the deformable membrane and a second layer on the first layer, the first and second layers each being composed of a material that can be etched selectively with respect to each other;
  etching the second layer, leaving portions of the second layer forming upper parts of the anchoring pins; and
  etching the first layer for a period greater than that of the first etching the second layer, leaving, under the remaining portions of the second layer, portions of the first layer each forming a base of an anchoring pin.

20. The method of producing a triaxial force sensor according to claim 18, in which the producing the anchoring pins comprises:
  depositing a sacrificial layer on the one of the principal faces of the deformable membrane;
  etching a plurality of holes in the sacrificial layer;
  depositing an anchoring material in the holes and on the sacrificial layer around the holes, forming the anchoring pins; and
  eliminating the sacrificial layer.

21. The method of producing a triaxial force sensor according to claim 12, further comprising, between the producing the detector to detect the deformation of the membrane and the producing the adhesion part, depositing an electrically insulating layer on the one of the principal faces of the deformable membrane, covering at least part of the detector to detect the deformation of the membrane, the adhesion part then being produced on the electrically insulating layer.

* * * * *